United States Patent [19]

Lewis

[11] 4,325,931

[45] Apr. 20, 1982

[54] METHOD OF PRODUCING AMMONIA

[76] Inventor: Derek C. Lewis, Chapmansgatan 5, 112 36 Stockholm, Sweden

[21] Appl. No.: 154,416

[22] PCT Filed: Dec. 18, 1978

[86] PCT No.: PCT/SE78/00096

§ 371 Date: Aug. 19, 1979

§ 102(e) Date: Jul. 23, 1979

[87] PCT Pub. No.: WO79/00407

PCT Pub. Date: Jul. 12, 1979

[30] Foreign Application Priority Data

Dec. 19, 1977 [SE] Sweden ................................ 7714433

[51] Int. Cl.³ .............................................. C01C 1/04
[52] U.S. Cl. .................................................... 423/363
[58] Field of Search .......................................... 423/363

[56] References Cited

U.S. PATENT DOCUMENTS

| 1,068,967 | 7/1913 | Bosch et al. | 423/363 |
| 1,313,314 | 8/1919 | Metzger | 423/361 |
| 1,483,412 | 2/1924 | Clancy | 423/363 |
| 1,608,926 | 11/1926 | Collett | 423/363 |
| 3,830,753 | 8/1974 | Ichikawa et al. | 423/363 |
| 4,163,775 | 8/1979 | Foster et al. | 423/363 |

FOREIGN PATENT DOCUMENTS

| 768802 | 6/1970 | Belgium | 423/363 |
| 591776 | 2/1960 | Canada | 423/363 |
| 563 | of 1875 | United Kingdom | 423/363 |
| 3345 | of 1912 | United Kingdom | 423/363 |
| 273735 | 10/1928 | United Kingdom | 423/363 |

Primary Examiner—O. R. Vertiz
Assistant Examiner—Wayne A. Langel
Attorney, Agent, or Firm—Burns, Doane, Swecker & Mathis

[57] ABSTRACT

A method is disclosed for the production of ammonia by catalyzed reaction between hydrogen and nitrogen, a new catalyst being used which is an intermetallic compound essentially consisting of at least one metal selected from the groups consisting of alkali and alkaline earth metals, with the exception of Be, and at least one metal selected from the group consisting of transition metals.

16 Claims, No Drawings

METHOD OF PRODUCING AMMONIA

TECHNICAL FIELD

The present invention relates to a method of producing ammonia by catalyzed reaction between hydrogen and nitrogen.

The world population explosion and ever more intensive cultivation on the cultivable parts of the earth's surface, has resulted, during the last 150 years, in continuous attempts to improve the efficiency in industrial fixation of atmospheric nitrogen, on which currently indispensible synthetic fertilizers are based. The world consumption of industrially produced ammonia has thus increased from about 15 million tons per year in 1960 to about 55 million tons per year today, about 80% of this ammonia being required in the production of the synthetic fertilizers. This demand, which is calculated to increase by about 10% per year, can only be satisfied by the direct synthesis of ammonia from hydrogen and nitrogen.

BACKGROUND ART

The completely dominating method for producing ammonia is thus based on the equilibrium equation $$N_2 + 3H_2 \rightleftharpoons 2NH_3 + \text{heat}.$$

Since heat is generated when ammonia is formed by this reaction, the concentration or yield of ammonia at equilibrium is decreased when the temperature increases. The reaction is, however, very slow at moderate temperatures, and in industrial applications it has been necessary to carry out the reaction at increased temperatures, thereby accepting a relatively low yield per unit operation in order to attain an economical production rate.

The total number of gas molecules present decreases when ammonia is formed, which means that the yield increases when the pressure is increased. The reaction rate also increases with increased pressures. For these reasons, a pressure of between 120 and 600 atmospheres has been used in different industrial forms of the basic process, e.g. Mont-Cenis, Haber-Bosch and Casale. The use of high pressures makes it necessary to use massive pressure vessels and effective gas pumps, which naturally make capital costs extremely high.

Direct synthesis of ammonia on a large scale did not become economically possible until Haber discovered a catalyst which noticeably increased the reaction rate, even at comparatively moderate temperatures. This made it possible to achieve a practical yield of about 30% ammonia at temperatures of between 350° C. and 600° C.

The catalyst used at present in the Haber-Bosch process consists of a mixture of iron oxide and relatively small amounts of oxides of lighter metals, e.g. potassium and aluminium. Modern plants in which this type of catalyst are used can be operated at 350°–400° C. and 200–350 atmospheres and give a yield of about 15–20% per unit operation.

Since the manufacture of ammonia is to a large extent dependent on the availability of cheap hydrogen gas, large efforts have been made to find methods for cheapening the production of hydrogen and for modifying the Haber-Bosch process after manufacturing the hydrogen gas. The transfer from coal to naphta as raw material for producing hydrogen gas meant, for example, that the manufacturing costs for ammonia could be halved during the 1960's. However, further radical improvements in this area are hardly to be expected, due to the continually increasing costs of raw materials.

Parallel to the work of obtaining cheaper hydrogen gas, research has been directed towards new catalysts, ever since Haber discovered his catalysts, for use in the direct synthesis of ammonia via hydrogen and nitrogen. Innumerable materials and combinations of materials have been tested, and certain improvements have been reported, but it is evident that no revolutionary discovery has been made, since the oxides mentioned above are the catalysts still in practical use.

Since innumerable catalysts have been tested during the years, it would appear to be almost impossible to summarize all the experiments that have been made, and even less possible to draw any conclusions as to how the catalyst could be improved. The majority are, however, of the Haber-type, i.e. they consist of heterogenous mixtures of metals and metal oxides. The catalysts, thus, consist of a mixture of many phases, including metals, and are usually produced by fusion at high temperatures and reduction. The first patent concerning such mixtures for catalysts in the synthesis of ammonia was granted to F. Haber about 70 years ago. Since then a number of catalysts of this type have been patented, in these the metals in the Haber mixture have completely or partially been replaced by other similar metals. Thus, e.g. chromium, cobalt or nickel have been used instead of iron, with sodium or magnesium as the light metal. As examples of heterogenous Haber-type mixtures can be mentioned those mixtures of vanadium and nickel and of magnesium and nickel, respectively, which are disclosed in the Swedish Pat. No. 131,225. It is true that it is implied in said patent specification that certain improvements with regard to pressure and temperature should be obtainable with the catalyst described, but obviously no drastic improvements have been obtained. What is still generally applicable to the Haber-type catalysts is therefore, that apart from consisting of heterogenous mixtures, they can not be said to be effective until at a temperature exceeding about 300° C.

It has further been found that intermetallic compounds based on rare earth metals are utilizable as catalysts in the synthesis of ammonia, and this has i.a. been disclosed by W. E. Wallace in a publication with the title: "Rare Earth and Actinide Intermetallics as Hydrogenation Catalysts" published at the International Symposium on Hydrides for Energy Storage in Geilo, Norway, on 14–19 August, 1977. In said publication it is stated that the new catalysts are not better than a known commercial catalyst, calculated on the basis of weight, but that they have greater activity expressed as conversion per m² of catalyst. There is nothing to be read concerning noticeable general improvement for the new catalysts, however, especially if it is born in mind that the price of a catalyst based on a rare earth metal ought to be comparatively high.

SUMMARY OF THE INVENTION

Taking into account the above, it is therefor surprising that according to the present invention, production of ammonia is enabled by the use of a new type of catalyst at substantially lower temperatures and pressures than earlier, which is demonstrated by experiments at room temperature and atmospheric pressure. This is achieved by the method according to the invention being given the characterizing features disclosed in the claims.

According to the present invention it has thus been found that by means of a new group of intermetallic compounds it is possible to radically alter the conditions for synthesizing ammonia from hydrogen and nitrogen, so that acceptable manufacturing costs can be maintained, although the costs for the raw materials can be expected to increase considerably in the future.

The method according to the invention for producing ammonia by catalyzed reaction between hydrogen and nitrogen comprises contacting a mixture containing hydrogen and nitrogen with an intermetallic compound essentially consisting of at least one metal selected from the groups consisting of alkali metals and alkaline earth metals, with the exception of Be, and at least one metal selected from the group consisting of transition metals.

The intermetallic compounds, which will be described in more detail in the working examples, are compounds known per se and are manufactured by The International Nickel Company via its affiliate, MPD Technology Corporation Inc. in the form of their hydrides, the compounds are recognised as being utilizable for storing hydrogen.

The ability of the intermetallic compounds to form hydrides is, thus, known per se, but their completely unprecedented ability of catalyzing the synthesis of ammonia has been undiscovered up to now.

The catalysts used according to the invention can be characterized as being built up from s-elements and d-elements and can therefore be called s-d-catalysts in contrast to the known catalysts based on alloys of metals from the lanthanide or actinide groups, i.e. an f-transition metal with a d-transition metal, and consequently coming into the group of f-d catalysts. Since the investigated catalysts are s-d catalysts, it can, thus, be expected that those giving the desired results will generally be compounds of alkali metals or alkaline earth metals on the one hand, and transition metals, i.e. metals in which the electronic structure contains an incomplete d-shell, on the other hand.

A further distinguishing feature of the metals found to work according to the invention is, however, that they form ionic or salt-like hydrides (e.g. Mg and Ca) or metallic hydrides (e.g. Cu and Ni), respectively. Characteristic for ionic or salt-like hydrides is that the bond occurs through attraction between cations and the H$^-$ anion. These compounds are similar to halogenide salts, e.g. NaCl, which means that the heat of formation and melting point are relatively high. Characteristic for metallic hydrides is that the bond occurs through attraction between atom nuclei in a lattice, and delocalized electrones in energy bands extending over the whole of the lattice. These compounds are characterized by variable stoichiometry, metallic gleam and high conductivity. The reason why Be, among the alkaline earth metals, does not fall within the scope of the invention is that beryllium is in the group forming covalent or volatile hydrides for which the bond occurs through attraction between atom nuclei and delocalized electrons in molecule orbits with weak van der Waal-forces between the molecules. These compounds are thermally unstable and the melting and boiling points are low.

The alkali metals of interest in practice, according to the invention, are Li, Na and K, while the utilizable alkaline earth metals are Mg, Ca, Sr, and Ba. The transition metals, i.e. the metals where the electron structure contains an incomplete d-shell are Ti, Zr, Hf, V, Nb, Ta, Cr, Mo, W, Mn, Tc, Re, Fe, Co, Ni, Ru, Rh, Pd, Os, Ir, Pt as well as Cu, Ag and Au.

According to a preferable embodiment of the invention an intermetallic compound is used, which essentially consists of at least one metal selected from the group consisting of alkaline earth metals, with the exception of Be, and at least one metal selected from the group consisting of the "3d period" of the Periodic Table, i.e. Ti, V, Cr, Mn, Fe, Co, Ni and/or Cu.

For cost reasons, preferred metals are on the one hand the alkaline earth metals Ca and Mg and on the other hand the metals in the iron group which are Fe, Co and Ni and Cu. Especially preferable are bimetallic compounds of Mg and Ni, of Ca and Ni and of Mg and Cu.

In contrast to the multiple phase metal mixtures which have previously been used in this connection, the term "intermetallic compound" is intended to convey in the present case an alloy or compound in one single homogenous phase. The intermetallic compound is, thus, a "daltonide", which is a common term for phases with constant compositions. For further information concerning intermetallic compounds of this kind reference can be made to the publication "A new family of hydrogen storage alloys based on the system nickel-mischmetal-calcium" by G. D. Sandrock, published in "Proceedings of the 12th Intersociety Energy Conversion Engineering Conference", Washington, D.C. Aug. 28–Sept. 2, 1977. The compounds can be produced according to any known method of producing intermetallic compounds, e.g. by induction fusion of the pure metals as is set forth in the above-mentioned Sandrock publication.

That the intermetallic compound "essentially" shall consist of at least one s- and at least one d-metal only means that the incorporation of other metals in minor amounts is also within the scope of the invention, provided that the desirable catalytical properties of the described s-d catalyst will thereby not be lost.

The active form of the catalyst is most probably the hydride form, which means that the intermetallic compound should be activated by hydrogenation beforehand. The alloy is, thus, reacted with hydrogen gas under pressure before it is used in the ammonia synthesis. The pressure required varies, of course, with the alloy used, but is easily determined by one skilled in the art from case to case.

The hydrides of the intermetallic compounds are nearly all so-called "berthollide" compounds, i.e. compounds containing phases of variable composition, and the proportion of hydrogen therein can vary within a fixed range. They are not solid solutions of hydrogen, but exist as a distinct phase. Any hydride of this kind is distinguished in that it has a definite hydrogen gas pressure, the so-called plateau pressure, which occurs in equilibrium with the hydride at any given temperature. (See for example the above-mentioned Sandrock publication). The X-ray and neutron diffraction patterns for the hydride and for the intermetallic starting compound are also characteristic, and completely different from the patterns for simple mixtures.

In spite of the berthollide nature of the hydride, its catalytic activity is dependent on the composition of the intermetallic starting compound. If the composition of the alloy deviates from the stoichiometry for the compound, other phases develop, which are considerably less effective as catalysts for synthesizing ammonia. For this reason and for the sake of simplicity, it is suitable to define the new catalysts by means of the stoichiometric formula which most closely corresponds to the composition of the hydride phase when it is saturated with hydrogen. For example, the binary compounds Mg and Ni, Ca and Ni, Mg and Cu, respectively, sold by the MPD Technology Corporation Inc. Under the trade name "HY-STOR", more specifically: $Mg_2Ni$ ("HY-STOR 301"), $CaNi_5$ ("HY-STOR 201") and $Mg_2Cu$ ("HY-STOR 302"), thus, give rise to the hydrides $Mg_2NiH_4$, $CaNiH_5$ and $Mg_2CuH_4$, respectively. As is applicable for the intermetallic compounds used according to the present invention, the hydrides thereof are unstable at high temperatures. Most of them are decomposed at a temperature of between about 300° C. and 500° C. to a mixture of phases comprising the separate metals of the compound.

Those intermetallic compounds of the kind described, which are to be found on the market today, are in the form of granules which decompose to a fine powder when hydrogenated. According to a preferred embodiment of the invention, the catalyst is used suspended in the form of a fluidized bed, in a flowing mixture of the reactant gases.

Even if a pure mixture of hydrogen and nitrogen gases is usually used in the reaction, it is to be understood that the reactants do not necessarily need to consist of pure hydrogen or nitrogen gas, respectively. Any reactants whatever, that occur in this connection, can, thus, be of interest. The hydrogen gas can, for instance, be derived from naphta, coal or electrolysis, while the nitrogen can, for instance, be supplied in the form of pure air. Since a crucial step in the synthesis of ammonia by the agency of the metallic hydride catalysts according to the invention is supposed to be the desorption of ammonia from the surface of the catalyst, it seems preferable to control said desorption. Such a control can be exercised by changes in the composition of the synthesis gas including the addition of other components than nitrogen and hydrogen. Thus, for instance, one or the other of the two reactants, nitrogen and hydrogen, can be utilized in excess of the stoichiometrical amounts.

Even if the catalyst according to the invention has been found to give good results at ordinary room temperature and atmospheric pressure, these conditions of course radically altering the possibilities of producing ammonia in an economically advantageous way, the optimum conditions for each individual intermetallic compound would naturally deviate somewhat from room temperature and atmospheric pressure. The fact that heat is generated during the reaction, even if the reactants are put together at room temperature, already means that the temperature automatically rises between 50° C. and 100° C. and carrying out some form of cooling ought not to be advantageous, especially as the optimum temperature can be expected to be well above room temperature. The temperature must, however, be kept below the decomposition temperature of the catalyst, which means that it may be said that the temperature generally lies within the range of about 25°–300° C. or even more preferably within the range of about 50°–250° C. The range of 50°–150° C. is especially preferred, since this would mean a very substantial saving in relation to the conditions prevailing for the currently used Haber-Bosch process. The optimum pressure is somewhere between atmospheric pressure and a pressure in the order of magnitude of 150 atms. A pressure range of 1–50 atms is, however, especially preferred, but since apparatus for providing a pressure in the order of magnitude of 100–150 atms is relatively well developed today, there should not be any large economical disadvantages if it were necessary to utilize a pressure exceeding 50 atms for certain catalysts. The great problem with the present Haber-Bosch process is, thus, the combination of high temperature and high pressure, and the circumstance that, according to the present invention, the reaction temperature can be lowered considerably, signifies in itself a substantial contribution to the technology in this field.

EXAMPLES

The invention is further illustrated by the following working examples, which are not to be taken as restricting the invention.

Example 1

An experiment was carried out on a laboratory scale in the following manner. The catalyst was produced by contacting the intermetallic compound $CaNi_5$ ("HY-STOR 201" from MPD Technology Corporation, Inc., USA) at room temperature with hydrogen gas under a pressure of about 10 atms for about 12 hours. 30 grams of the catalyst were subsequently transferred to a glass cylinder, which was kept in an oil bath heated to approximately 50° C. A mixture of hydrogen and nitrogen gases in a volumetric ratio of 1:3 was passed through the cylinder at a rate of 323 $cm^3$/min. The catalyst was hereby suspended as a fluidized bed with a volume of about 20 $cm^3$. The temperature in the bed rose due to heat being generated during the reaction between the nitrogen and the hydrogen.

A known volume of the effluent gases was collected at given time intervals, and the content of ammonia therein was determined by absorption in an excess of standardized acid, which was then titrated with standardized alkali.

The yield of ammonia was determined in this way to about 8% (vol/vol STP) per liter of catalyst and hour. The reaction temperature was about 100° C., while the values for pressure and "space velocity" were 1 atmosphere and 1000 $h^{-1}$, respectively.

Examples 2–4

The experiment from Example 1 was repeated with the intermetallic compounds $CaNi_5$ ("HY-STOR 201") $Mg_2Ni$ ("HY-STOR 301") and $Mg_2Cu$ ("HY-STOR 302"), all sold by MPD Technology Corporation Inc., with the differences relative to Example 1 that the catalyst bed was enclosed in an apparatus kept at a temperature close to 100° C. and the ammonia analysis was carried out spectrophotometrically using Nessler's reagent. The analytical samples were obtained by absorbing the ammonia in water at room temperature. Other differences will be clear from the table below, in which results from the experiments are summarized:

| Catalyst substrate | Pressure atm | Temp. °C. | Space Velocity l(gas)/ l(cat) . h | % (v/vNH$_3$/ l(cat) . h | |
|---|---|---|---|---|---|
| | | | | "Stoichio" | "Desorp." |
| CaNi$_5$ | 1.0 | 100 | 10 | 1.0 | 5.0 |
| Mg$_2$Ni | 1.0 | 113 | 17 | 0.02 | 0.4 |
| Mg$_2$Cu | 1.0 | 100 | 21 | 0.04 | — |

The results under the heading "Stoichio" and "Desorp." in this table refer to the yield of ammonia in experiments in which the synthesis gases were, respectively, the stoichiometric (1:3) mixture of nitrogen and hydrogen "Stoichio"), and other mixtures ("Desorp") containing gases that can displace ammonia adsorped on the surface of the catalyst. Oxygen and argon are examples of such gases but also nitrogen has a similar effect. In the present case there were added in the experiments under the heading "Desorp.", minor amounts of so called respiration air, i.e. air free from carbon dioxide and hydrocarbons, to the stoichiometric mixture of nitrogen and hydrogen.

In those experiments the catalyst substrate $Mg_2Cu$ could be activated only to a limited extent. Thus, the yield cited for this catalyst is a minimum value, lower than that which can be obtained if the catalyst is completely activated.

I claim:

1. A method of producing ammonia by catalyzed reaction between hydrogen and nitrogen, which comprises contacting a mixture containing hydrogen and nitrogen gases with an intermetallic compound consisting essentially of at least one metal selected from the groups consisting of alkali metals and alkaline earth metals, with the exception of Be, and at least one metal selected from the group consisting of transition metals.

2. A method as claimed in claim 1, which comprises using as the intermetallic compound, a compound consisting essentially of at least one metal selected from the group consisting of alkaline earth metals, with the exception of Be, and at least one metal selected from the group consisting of Ti, V, Cr, Mn, Fe, Co, Ni and Cu.

3. A method as claimed in any claim 2, which comprises subjecting the intermetallic compound to a prehydrogenation.

4. A method as claimed in claim 1 or 3, which comprises carrying out the reaction at a temperature within the range of 25°–300° C.

5. A method as claimed in claim 4, which comprises maintaining the temperature within the range of 50°–250° C.

6. A method as claimed in claim 5, which comprises maintaining the temperature within the range of 50°–150° C.

7. A method as claimed in claim 4, which comprises carrying out the reaction at a pressure within the range of 1–150 atmospheres.

8. A method as claimed in claim 7, which comprises maintaining the pressure within the range of 1–50 atmospheres.

9. A method as claimed in claim 2, which comprises using as the intermetallic compound, a compound consisting essentially of at least one metal selected from the group consisting of Mg and Ca and at least one metal selected from the group consisting of Fe, Co, Ni and Cu.

10. A method as claimed in claim 9, which comprises using a bimetallic compound of Mg and Ni.

11. A method as claimed in claim 9, which comprises using a bimetallic compound of Ca and Ni.

12. A method as claimed in claim 1 or 2, which comprises using the intermetallic compound suspended as a fluidized bed in the mixture containing hydrogen and nitrogen gases.

13. A method as claimed in claim 1 or 2, which comprises adding the nitrogen in the form of air.

14. A method as claimed in claim 1 or 2, which comprises controlling the yield by adding hydrogen or nitrogen in excess over the stoichiometrical amounts.

15. A method as claimed in claim 1 or 2, which comprises adding also another gas than hydrogen and nitrogen.

16. A method as claimed in claim 2, which comprises using a bimetallic compound of Mg and Cu.

* * * * *